June 30, 1953     H. R. GREENLEE     2,643,749
SPRING TYPE CLUTCH
Filed Dec. 31, 1948
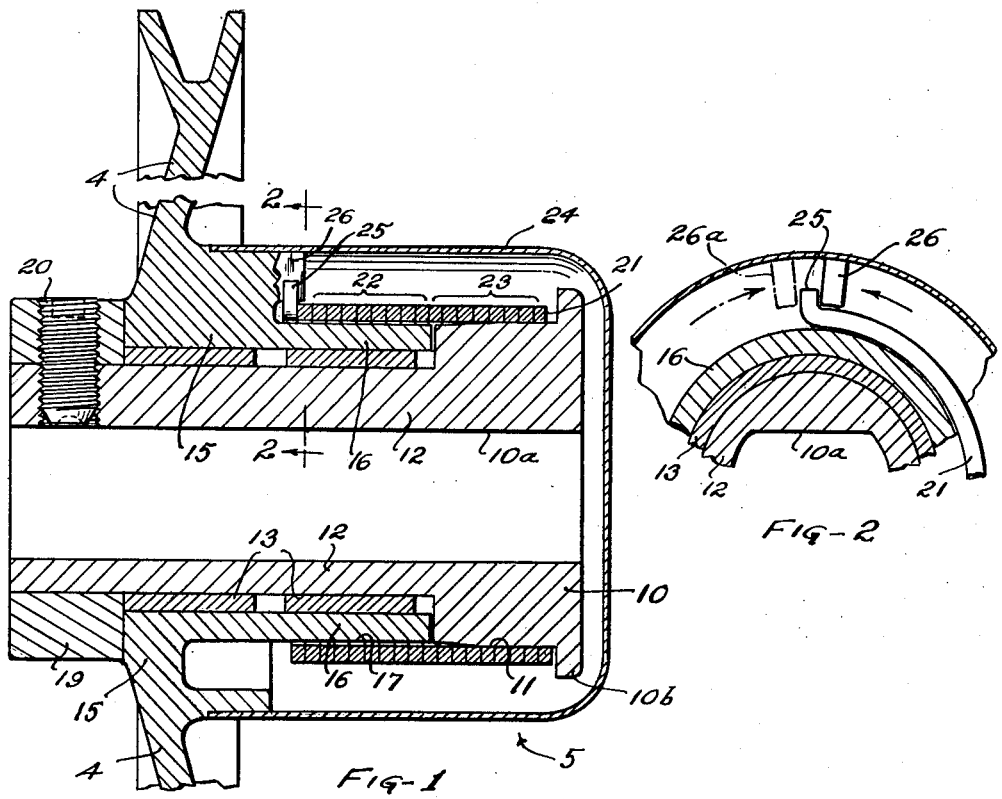
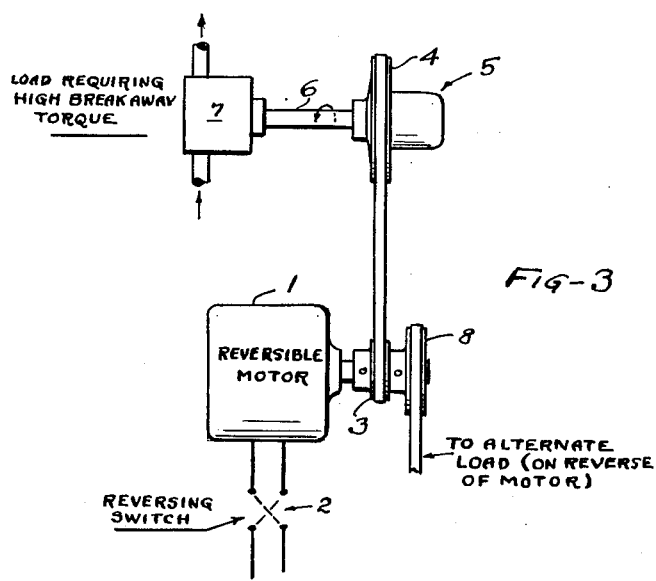
INVENTOR.
HARRY R. GREENLEE
BY
ATTORNEY Patented June 30, 1953

2,643,749

UNITED STATES PATENT OFFICE 2,643,749

SPRING TYPE CLUTCH

Harry E. Greenlee, Indianapolis, Ind., assignor, by mesne assignments, to The Marquette Metal Products Company, Cleveland, Ohio, a corporation of Ohio Application December 31, 1948, Serial No. 68,627

2 Claims. (Cl. 192—41)

The invention relates primarily to a delayed action overrunning spring clutch, thus indicating the principal object.

In certain uses for overrunning or free-wheeling types of spring clutches it is desirable to provide a considerable delay between the instant the normal overrunning operation ceases and the instant the locking or positive drive coupling through the clutch occurs. The problem is illustrated by cyclic sequential operation of two loads through automatically overrunning clutches by a common reversible electric motor and wherein at least one of those loads requires high starting or breakaway torque after an idle period. In laundry machinery, for example, the reversible motor may be continually coupled as by belts to reversely acting overrunning spring clutches whereby to transmit motor torque through one overrunning clutch to a washing portion of the machine during a predetermined time while the other clutch overruns idly and then, merely by reversing the motor, useful torque can be transmitted only through such other clutch for a predetermined time to a dryer portion of the machine. The dryer portion, for example, may include a pump requiring high breakaway torque, and since overrunning spring clutches advantageously lock up instantly upon reversal of input motion to the spring it is desirable to provide a sufficient lag or time delay in the pump driving clutch operation so that the motor can attain or approach its normal running speed prior to being loaded. The present invention provides an overrunning spring clutch with such delayed action (e. g. upon reversal of a driving motor) without complicating the clutch, adding to its cost or interfering in any way with its efficiency as a one-way-driving or overrunning coupling, thus indicating a further object. Other objects will become apparent from the following description of the preferred illustrative embodiment shown in the drawing, wherein:

Fig. 1 is a central longitudinal sectional view through the improved spring clutch in one form;
Fig. 2 is a detail fragmentary sectional view taken as indicated at 2—2 on Fig. 1; and Fig. 3 is a diagram illustrating a typical use of the invention.

Fig. 3 shows a reversible electric motor at 1, reversing control switch at 2 and a drive pulley at 3 on the rotor shaft of the motor. The drive pulley is continually coupled with a pulley 4 of the overrunning spring clutch unit 5 of Fig. 1 which through a suitable driven shaft 6 drives the load 7 when the motor is turning in one direction only. The load 7 may comprise a suction pump such as requires high starting torque as in order to overcome static friction of the pump impeller against the pumping chamber. Assuming it is desired that the pump impeller be at rest during operation of another part of the mechanism (not shown) which other part would be idle when the pump is operative, such other part can be driven by the motor shaft, as through a second drive pulley 8 thereon continually coupled with another overrunning clutch (not shown) so as to transmit torque only when the motor is turned in the opposite direction; and upon being so turned the clutch 5 automatically disconnects the pump shaft 6 from the belt driven pulley 4. The arrangement is, of course, only typical. The switch 2 can be automatically actuated to reverse the motor and thus predetermine the duration of each indicated cycle of operation or can be manually controlled as desired.

The clutch 5 as illustrated in Figs. 1 and 2 is of the double drum, contracting-to-grip type comprising a tubular shaft adapter 10 of circular section from end to end having an internal driving flat 10a and an outer end flange 10b. The adapter has a generally cylindrical portion indicated by clutch drum surface 11 and a relatively reduced cylindrical portion 12 supporting suitable journal bearing bushings 13 in the driving pulley 4. The hub portion 15 of the pulley has a reduced cylindrical extension 16 provided with a generally cylindrical clutch drum surface 17 concentric with drum surface 11 and closely adjacent thereto. Both drum surfaces may be of exactly equal diameter. The pulley may be maintained in proper relationship to the adapter 10 by a mounting ring 19 secured as by a set screw 20 which also fastens the adapter 10 to the drive shaft 6.

The clutch spring 21 comprises as usual a plurality of turns of wire of suitable section forming a series of coils 22 which may be normally slightly spaced or in non-clutching relationship to the drum surface 17 for load shock absorption and a main group 23 of clutching coils in embracing relation to the drum surface 11. Assuming the direction of operation of the pump shaft 6 to be as indicated by the arrow on Fig. 3, the spring is left-hand wound. At least some of the spring coils 23 are in interference fitting relation to the drum surface 11 for conventional self-energizing operation of the clutch. The coils 23 are otherwise unattached to the drum 11 whereby to permit overrunning of the coils 23 on the drum when the direction of rotation is as indicated by the broken arrow, Fig. 2. A suitable housing for the clutch elements described may comprise a cup shaped shell secured to the pulley hub 15.

The driving connection between the pulley 4 and the coils 22 of the spring is, as shown, an outwardly bent toe 25 on the leftward terminal coil 22 in the plane of rotation of a lug or pin 26 on the hub portion 15 of the pulley. The spring coils 22 are mainly provided to protect the toe from having to transmit all the torque imposed on the clutch.

The coils 22 of the clutch spring 21 are arranged to be normally in radially spaced relationship to the drum surface 17 of wheel 4, as illustrated, partly to insure that during reversal of the electric motor 1 from driving to non-driving condition in respect to subject clutch 5 the lug or pin 26 will be certain to move to its dotted-line-illustrated position 26a, Fig. 2. Additionally the free coils serve as a shock absorber upon subsequent reengagement of the lug or pin 26 with the spring toe 25. If the coils 22 were in contact with the drum 17 at all times (or were the clutch otherwise arranged with no provision for yield as energizing abutment—full lines, Fig. 2—takes place) then the energizing operation would be likely to snap off the toe.

The arrangement, as shown, enables free rotation of the pulley on the adapter 10 through approximately a complete circumference before the driving lug 26, through engagement with the spring toe 25, causes the gripping operation of the clutch.

When the toe 25 is encountered by the lug 26 as shown in Fig. 2 (solid arrow indicating the direction) the spring coils are all contracted tightly on respective drum surfaces and the pump impeller is driven as usual in the operation of a double drum type spring clutch. When the motor 1 is reversed from having driven the pump shaft the lug 26 travels free of the spring for nearly a full turn and then the opposite side or abutment surface of the lug engages the spring toe 25 (broken line position 26a of lug as in Fig. 2) expanding the coils 22 clear of the drum 17 and also expanding the coils 23 sufficiently to make them overrun lightly on the drum surface 11. The overrunning continues and the driving lug 26 stays in the broken line illustrated position until the motor 1 is again reversed.

Assuming the motor has a 1:2 ratio speed reducing connection with the pulley 4, as indicated by the relative size of the pulleys illustrated, it will be apparent that the motor makes approximately two idle revolutions clockwise from the overrunning position until the driving lug 26 encounters the toe 25 as shown in full lines Fig. 2. Such two idle rotations of the motor shaft are usually more than sufficient to enable the motor to attain its normal operating speed before encountering the load.

If the present clutch is located on the motor shaft then the maximum delayed action obtainable is approximately one full turn of the motor shaft which is sufficient in most cases of high breakaway torque load. Thus in any case requiring a load speed the same as or higher than motor shaft speed the present clutch can either be connected to the motor shaft or to a special reduction portion of the drive between motor and load, whichever will enable the desired or required delayed action for breakaway purposes as hereinbefore described.

The required number of idle rotations of the motor to permit attainment of substantial motor speed could be obtained in part by increasing the reduction ratio as between the pulleys 3 and 4 in which case the lug 26 could be much wider circumferentially than as shown so that there would be comparably less circumferential lost motion between the opposite abutment surfaces of the lug and the spring toe.

It will also be apparent that the necessary lost motion or delayed action connection may be between the driven member 10 and the clutch spring, as by providing a lug on the adapter flange 10b and a spring toe on the right-hand terminal portion of the clutch spring. In such case, the clutch spring would be in permanent interference fitting overrunning relationship with the drum 17 and the coils 23 would be normally free on the drum 11.

The present clutch is not necessarily confined to use with a reversely acting power source or to a double or multiple load drive mechanism or to a high breakaway torque load. If, for example, the driving means includes a flywheel (as in place of pulley 4) the present clutch by reason of its delayed action feature and shock-absorbing action would enable the flywheel advantageously to attain substantial momentum before having to pick up its load through the clutch and without likelihood of damaging any part of the clutch.

The spring clutch hereof can, of course, by reversal of parts be made as an expanding-to-grip spring clutch instead of the contracting type shown.

I claim:

1. In combination with a reversible electric motor and a torque transmitting driving or input clutch member continually connected therewith, a load having a high breakaway torque and a driven or output clutch member continually connected therewith and axially aligned with the driving clutch member, one of said clutch members having a circular clutch drum surface, a helical clutch spring with coils always in self-energizing relation to the drum surface for gripping the same during forward driving of the motor in relation to said load but capable of overrunning thereon during reverse operation of the motor, the other of the clutch members having a drum surface positioned to be gripped by other coils of the spring and having an action-delaying energizing abutment connection with a free end of one of said other coils, said connection providing sufficient wholly free angular lost motion in respect thereto so that the motor after reverse driving can attain substantial forward-direction running speed before energization of the clutch spring takes place.

2. An overrunning, helical spring clutch assembly for use to automatically connect a reversible electric motor to a load having high breakaway torque after a predetermined starting period of operation of the motor in a forward direction and to disconnect the motor from the load consequent upon reverse operation of the motor; said assembly comprising a driving drum adapted for connection with the motor, a driven drum adapted for connection with the load, a helical clutch spring bridging the drums, said spring having coils in interference-fitting hence self-energizing, relationship with the driven drum and being otherwise unconnected therewith for enabling non-load-driving reverse operation of the motor, the spring having a series of coils around the driving drum which, in a relaxed state, are free from gripping relationship with the driving drum, the endmost coil of said series having a toe extending laterally therefrom, and the driving drum having a lug turning therewith in a fixed path and of sufficiently limited extent circumferentially of the asssembly so that opposite sides of the lug alternately engage the toe after approximately a full idle turn of the driving drum in respective directions relative to the driven drum, the lug, through connection with the load, thus causing the forward drive operation of the motor following reverse operation to drive the load only after such idle turn of the driving drum followed by flexing of coils of said series into gripping relation to the driving drum.

HARRY R. GREENLEE.

References Cited in the file of this patent

UNITED STATES PATENTS

| Number | Name | Date |
|---|---|---|
| 1,749,066 | Burton | Mar. 4, 1930 |
| 2,052,961 | Bonham | Sept. 1, 1936 |
| 2,289,884 | Raber | July 14, 1942 |
| 2,381,567 | Bonham | Aug. 7, 1945 |
| 2,459,972 | Starkey | Jan. 25, 1949 |

FOREIGN PATENTS

| Number | Country | Date |
|---|---|---|
| 25,120 | Great Britain | 1909 |